(12) United States Patent
Burke, II et al.

(10) Patent No.: US 6,249,726 B1
(45) Date of Patent: Jun. 19, 2001

(54) METHOD AND APPARATUS FOR RESPONDING TO FAILURE OF A LOAD

(75) Inventors: James O. Burke, II, Lake in the Hills; Dean R. Solberg, Mundelein, both of IL (US)

(73) Assignee: Kold Ban International, Ltd., Lake in the Hills, IL (US)

(*) Notice: Subject to any disclaimer, the term of this patent is extended or adjusted under 35 U.S.C. 154(b) by 0 days.

(21) Appl. No.: 09/212,535

(22) Filed: Dec. 16, 1998

(51) Int. Cl.$^7$ ........................................... G06F 7/00
(52) U.S. Cl. ..................... 701/29; 701/36; 192/3.31; 192/150; 477/176
(58) Field of Search .................... 701/1, 29, 31, 701/35, 36; 192/3.31, 103 R, 150; 477/174–176

(56) References Cited

U.S. PATENT DOCUMENTS

| | | | |
|---|---|---|---|
| 3,121,314 | 2/1964 | Koyanagi | 62/133 |
| 3,141,103 | 7/1964 | Asano | 310/95 |
| 3,400,795 | 9/1968 | Miller | 192/56 |
| 3,651,658 | 3/1972 | Kushida | 62/228 |
| 3,686,891 | 8/1972 | Wills | 62/158 |
| 3,915,271 | 10/1975 | Harper | 192/33 |
| 3,933,005 | 1/1976 | Beltz | 62/228 |
| 4,232,772 | 11/1980 | Brissey | 192/114 |
| 4,393,966 | 7/1983 | Kono | 192/56 |
| 4,462,491 | 7/1984 | Kono | 192/84 |
| 4,703,627 | 11/1987 | Nakajima | 62/133 |
| 4,877,118 | * 10/1989 | Tamura | 192/103 R |
| 5,167,127 | 12/1992 | Ohtsu | 62/133 |
| 5,190,130 | * 3/1993 | Thomas et al. | 477/176 |
| 5,201,186 | 4/1993 | Hanson | 62/126 |
| 5,249,429 | 10/1993 | Hanson | 62/86 |
| 5,546,755 | 8/1996 | Krieger | 62/133 |

* cited by examiner

Primary Examiner—William A. Cuchlinski, Jr.
Assistant Examiner—Edward Pipala
(74) Attorney, Agent, or Firm—Brinks Hofer Gilson & Lione

(57) ABSTRACT

An apparatus for responding to failure of a secondary load driven by a primary mover includes at least one sensor sensing a rotational parameter of the secondary load and an electronic control module for (1) disengaging the secondary load from the primary mover and subsequently re-engaging it when the sensed rotational parameter indicates a first range of slip, (2) disengaging the secondary load from the primary mover when the sensed rotational parameter indicates a second range of slip, and (3) deactivating the primary mover when said sensed rotational parameter indicates a third range of slip.

46 Claims, 4 Drawing Sheets

Microfiche Appendix Included
(1 Microfiche, 31 Pages)

METHOD AND APPARATUS FOR RESPONDING TO FAILURE OF A LOAD

REFERENCE TO MICROFICHE APPENDIX

A microfiche appendix is included of a circuit schematic and computer program listing. The total number of microfiche is 1. The total number of frames is 31.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a monitoring apparatus and method for controlling the engagement of a driving force to a power take off accessory. More particularly, the present invention relates to a monitoring apparatus and method capable of disengaging the driving force from the accessory when a failure is detected, with the improved ability to correct minor failures and mitigate damage caused by major failures.

BACKGROUND

Most modern vehicles today have some form of air conditioning system installed for the comfort of the vehicle's operator and passengers. The air conditioning typically includes an air conditioning compressor powered by the vehicle's engine. The compressor is usually connected to the engine by a belt which connects a driving pulley on the engine to a pulley on the compressor. Further, the pulley on the compressor is typically connected to the compressor using some form of clutch mechanism. This clutch mechanism allows the compressor to be engaged or disengaged from the engine whenever the air conditioning is turned on or off. This prevents unnecessarily loading down the engine, saves fuel and reduces wear and tear on the various components involved.

It is common for such vehicle air conditioning compressors to fail when a bearing seizes, lubrication fails or other components break causing the compressor to substantially slow down or seize completely. When this happens, the load on the engine or the belt and clutch mechanism increases substantially. This could potentially result in serious damage to the engine, belt or clutch or further damage to the compressor. In engines utilizing a single belt to connect the compressor, the cooling fan and other components, the breakage of the belt can cause overheating of the engine which can result in serious damage.

U.S. Pat. No. 4,462,491 discloses a monitoring system to detect failure of the air conditioning compressor and disengage the compressor in the event of such failure. The disclosed system uses one or more sensors to detect the rotation of the pulleys on the engine and on the compressor. When the rotations of the engine pulley and the compressor pulley diverge by a pre-set amount, or when the rotation of the compressor pulley falls below a pre-set threshold, the monitoring system determines that a failure has occurred and disengages the compressor from the engine. This system keeps the compressor disengaged as long as the particular failure conditions are present. This system is not capable of distinguishing between different types of failures and therefore responds to any failure in the same way.

Accordingly there is a need for an improved monitoring apparatus which monitors a secondary load coupled to a primary mover and disengages the secondary load upon detection of a failure. Further, there is a need for a monitoring apparatus which provides a staged response to different failure situations and which has the ability to correct minor failures and mitigate damage caused by major failures. Still further, there is a need for monitoring apparatus which retains information regarding prior failures and prevents operation of the primary mover or secondary load before the prior failure has been repaired.

SUMMARY

Typically, not all failures of secondary loads are equal and some failures are more serious than others. In some cases, such as when starting the engine, the compressor may be temporarily stuck due to stiction caused by cold temperatures or inadequate lubrication. In cases such as these, disengaging the compressor and then re-engaging the compressor may provide enough "shock" to the compressor mechanism to overcome whatever is preventing it from moving freely. This can save an unnecessary trip to the repair shop and prevent unnecessary discomfort from the unavailability of the air conditioning system.

In other cases, the magnitude of the failure may be so severe that not even disengaging the compressor from the engine will prevent catastrophic damage. This can happen where the clutch mechanism fails and it becomes impossible to disengage the failed compressor from the engine. In this case, it would be advantageous to be able to automatically deactivate the engine to mitigate damage to the engine and compressor.

The problems outlined above are in large part solved by an apparatus for controlling engagement of a secondary load to a primary mover according to the present invention. In one embodiment, there is provided at least one sensor adapted to sense rotation of the secondary load or the primary mover, where the sensor provides a sensor output representative of rotational speed of the secondary load or the primary mover. Further, there is provided an electronic control module coupled to the sensor output and further coupled to the primary mover and the secondary load. The electronic control module comprises logic responsive to the sensor and operative to control the engagement of the secondary load to the primary mover and further operative to control the operation of the primary mover itself.

The present invention further contemplates a method for controlling a driving force applied by an engine to a power take-off driven accessory comprising the steps of: sensing rotational parameters of the engine or the accessory; calculating a slip parameter from the sensed rotational parameters; generating a disengagement signal to the accessory when the slip parameter is within a first range of slip; and generating a deactivation signal to the engine when the slip parameter is within a second range of slip.

The preferred embodiment described below monitors a secondary load coupled to a primary mover and disengages the secondary load upon detection of a failure. Further, this embodiment provides a staged response to different failure situations and has the ability to correct minor failures and mitigate damage caused by major failures. Still further, this embodiment retains information regarding prior failures and prevents operation of the primary mover or secondary load before the prior failure has been repaired.

DETAILED DESCRIPTION OF THE PRESENTLY PREFERRED EMBODIMENTS

Figure 1:
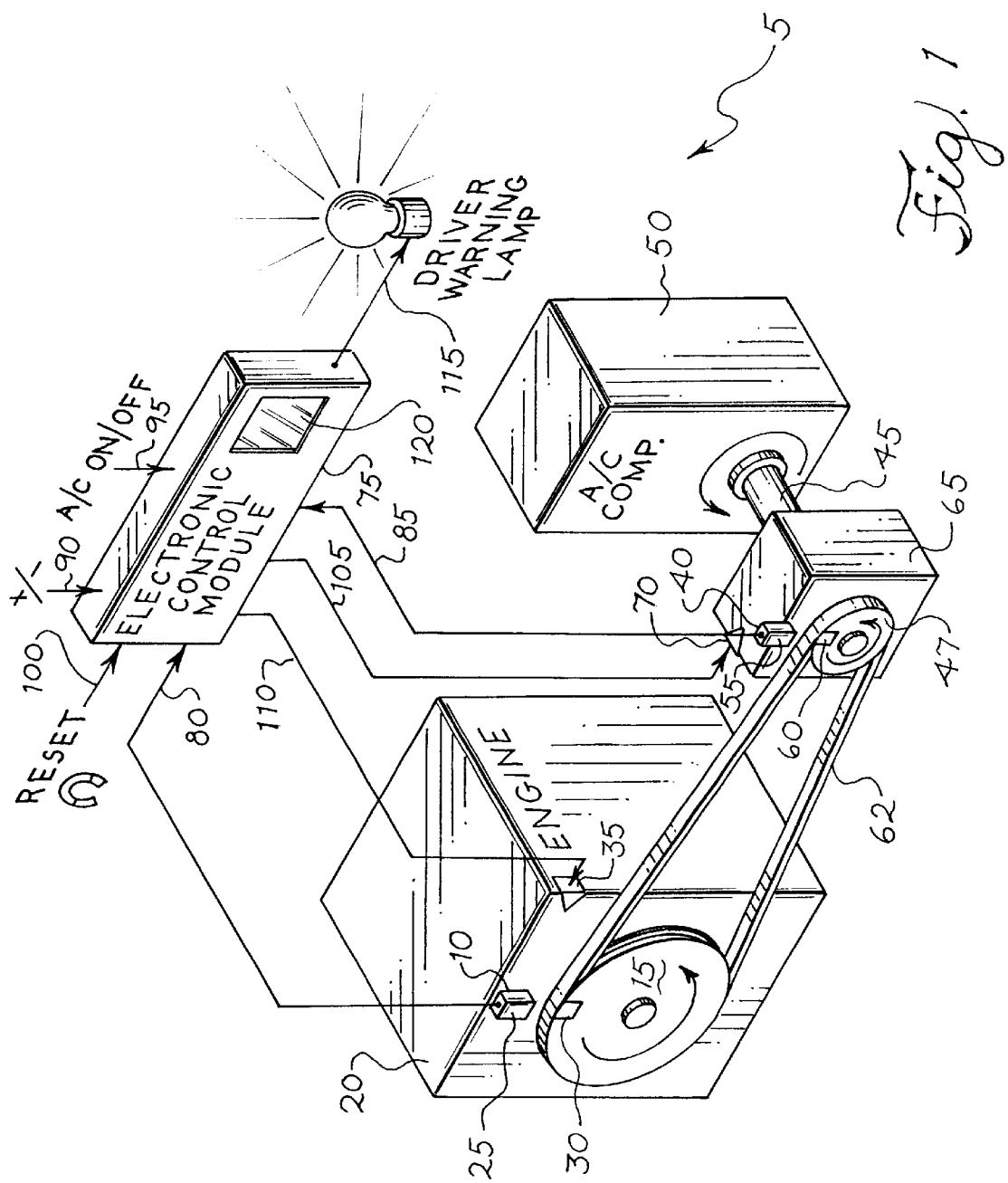
FIG. 1 is a block diagram of the preferred embodiment of the present invention.

Turning now to the drawings, FIG. 1 shows selected components of an air conditioner system driven by an internal combustion engine 20. The engine 20 is an example of a primary mover. Other examples of primary movers can include diesel engines, electric motors, turbine powered engines or other kinds of motors. The engine 20 includes a deactivation control mechanism 35 which can be used to deactivate the engine 20. In the preferred embodiment, the deactivation control mechanism 35 includes an engine management computer which has an auxiliary control input. The control input is a digital signal which is active low. To deactivate the engine, a logic "0" is asserted on the control input. For the engine to operate, a logic "1" must be maintained on the control input. Alternatively, the control mechanism 35 can respond to a different form of control input or the control mechanism 35 can include an ignition, fuel or power interrupt. The engine 20 is coupled to a power take off accessory such as an air conditioning compressor 50. Alternatively, other types of accessories that can be coupled to the engine 20 include other types of compressors or pumps such as a power steering pumps or oil pumps. In addition, the power take off accessory can also include any suitable driven devices such as transmissions, wheels or tracks.

The engine 20 is coupled to the compressor 50 by a belt drive 62 and clutch plate mechanism 65 connected between a rotational output such as a first pulley 15 on the engine 20 and a rotational input such as a shaft 45 on the compressor 50. Alternatively, the coupling 62, 65 can include a v belt, a ribbed belt, a direct drive clutch plate mechanism, a torque converter or direct gear drive mechanism. The clutch plate mechanism 65 includes a second pulley 47 and an engagement control mechanism 70. The belt drive 62 connects the first pulley 15 to the second pulley 47. The engagement control mechanism 70 engages or disengages the second pulley 47 from the shaft 45 in order to engage or disengage the engine 20 to or from the compressor 50. In the preferred embodiment, the engagement control mechanism 70 includes a magnetically engaged clutch plate mechanism. The engagement control mechanism 70 is responsive to an accessory engagement input 95 which is connected to an operator control (not shown). In the preferred embodiment, this operator control includes an air conditioning control switch. When the operator turns the air conditioning control switch on, the accessory engagement input 95 causes the engagement control mechanism 70 to engage the compressor 50 to the engine 20.

A monitoring apparatus 5 includes a first sensor 10 which is coupled to the first pulley 15 on the engine 20. In the preferred embodiment, the first sensor 10 is adapted to sense the rotation of the first pulley 15. Alternatively, the first sensor 10 can be adapted to sense the torque output of the engine 20, movement or strain of the belt drive 62 and clutch plate mechanism 65 or other alternate coupling, or other rotational parameter such as temperature. In order to sense temperature, the first sensor 10 can also be a thermal sensor adapted to sense heat created by friction within the belt drive 62 and clutch plate mechanism 65 or other alternate coupling means. Further, the monitoring apparatus can use only the second sensor 40 (described below) without the first sensor 10. In the preferred embodiment, the first sensor 10 includes a magnetic pickup 25 fixed with respect to the engine and magnetic pickup teeth 30 mounted to rotate with the first pulley 15. Alternatively, sensor 10 can include an optical sensor and light source or a mechanical sensor coupled to the first pulley 15, all of which are well known in the art.

In the preferred embodiment, the monitoring apparatus 5 further includes a second sensor 40 coupled to the second pulley 47 on the clutch plate mechanism 65. The second sensor 40 is adapted to sense the rotation of the second pulley 47. Further, the monitoring apparatus can use only the first sensor 10 without the second sensor 40. Alternatively, the second sensor 40 can be adapted to sense the torque applied by the engine 20 to the second pulley 47, movement or strain of the belt drive 62 and clutch plate mechanism 65 or other alternate coupling or other rotational parameter such as temperature. In order to sense temperature, the second sensor can also be a thermal sensor adapted to sense heat created by friction within the belt drive 62 and clutch plate mechanism 65 or other alternate coupling means. In the preferred embodiment, the second sensor 40 includes a magnetic pickup 55 fixed with respect to the clutch plate mechanism 65 and magnetic pickup teeth 60 mounted to rotate with the second pulley 47. Alternatively, the second sensor 40 can include an optical sensor and light source or a mechanical sensor coupled to the second pulley 47, all of which are well known in the art.

The monitoring apparatus 5 also includes an electronic control module (ECM) 75. The ECM 75 has inputs 80 and 85 to receive the outputs of the first and second sensors 10 and 40. The ECM 75 also has a power input 90, an accessory engagement input 95 and a reset input 100. Further, the ECM 75 has an output 105 that connects to the engagement control mechanism 70 and an output 110 that connects to the deactivation control mechanism 35. The ECM 75 also has an output 115 for a warning light and a trouble code indicator 120. In the preferred embodiment, the trouble code indicator 120 is an LED display visible from outside the ECM 75.

Figure 2:
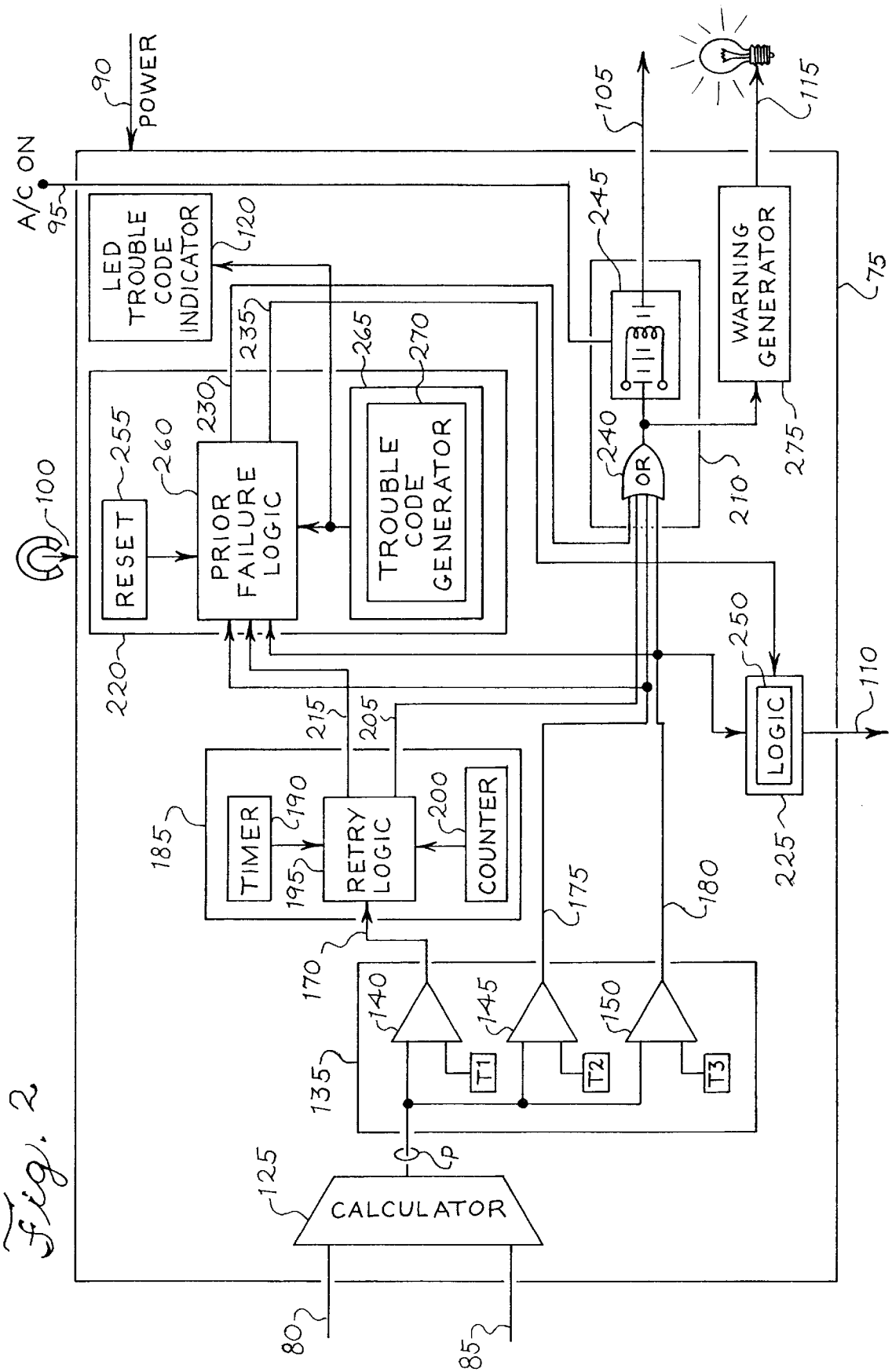
FIG. 2 is a block diagram depicting the electronic control module of FIG. 1.

Referring to FIG. 2, the preferred embodiment of the ECM 75 is implemented in digital logic. Alternatively, an analog circuit can also be used. The ECM 75 includes a calculator 125 which is connected to inputs 80 and 85 and which receives the outputs of the first and second sensors 10 and 40 and computes a slip parameter P representative of the slip between the respective pulleys 15 and 47 of the engine 20 and the clutch plate mechanism 65. In the preferred embodiment, the calculator 125 computes the slip parameter P as a percentage of slip according to the following formula:

$$P = \frac{V1 - kV2}{V1} \times 100$$

Where,
$V1$=speed of first pulley 15,
$V2$=speed of second pulley 47, and
$k$=a proportionality constant.

The proportionality constant k is selected such that kV2=V1 in the absence of slip between the pulleys 15, 47. For example, in this preferred embodiment, k=C1/C2, where C1 is the circumference of the pulley 15 and C2 is the circumference of the second pulley 47. In this example, P ranges from 0 (0% slip) to 100 (100% slip) and thereby provides a measure of slippage between the pulleys, 15, 47.

Alternatively, the calculator 125 can compute the slip parameter P as the torque delivered to the compressor 50 by the engine 20. Further, utilizing only a single sensor, the calculator can compute only the RPM of the engine 20 or compressor 50 or the torque strain transferred to the engine 20 by the compressor 50. In addition, where the first sensor 10 or the second sensor 40 are thermal sensors, the calculator 125 can compute the slip parameter as a function of the temperature sensed. The slip parameter P is intended to encompass any indicator of slip between the compressor 50 and the engine 20.

The ECM 75 further comprises a comparator mechanism 135. The comparator mechanism 135 includes three comparators 140, 145, 150 which compare the slip parameter P computed by the calculator 125 to respective thresholds T1, T2 and T3. In the preferred embodiment, the comparators are implemented as a software algorithm which performs the three comparisons. Alternatively, the comparator mechanism 135 can include three analog comparators or a single comparator which serially performs the comparisons. The threshold T1 is preferably stored by a jumper circuit on the ECM's 75 printed circuit board wherein this jumper circuit has multiple setting allowing for various pre-set T1 thresholds. In the preferred ECM 75, T1 can have the value of 1, 2, 3 or 4% depending on the jumper setting. The thresholds T2 and T3 are calculated as multiples of the threshold T1, where T2 is twice the value of T1 and T2 is four times the value of T1. Alternately, the threshold T1 can be stored in a read only memory or a register. Further, thresholds T2 and T3 can be calculated using different multipliers or come other form of mathematical relationship or values for thresholds T1, T2, T3 can be stored in registers, a read only memory or in some other form of user programmable storage device. It is preferable that the threshold T2 represent a more Severe slip condition than the value of the threshold T1, and that the threshold T3 represent a more severe slip condition than the value of threshold T2. Each threshold, therefore, represents a more severe failure condition than the previous one. This allows the ECM 75 to stage its response (as described below) to different failure situations depending on how severe the failure is. The comparators 140, 145 and 150 provide output signals 170, 175, 180 which transmit the result of their respective comparisons.

The output 170 of the comparator 140 connects to a retry mechanism 185 of the ECM 75. The retry mechanism 185 includes a timer 190, retry logic 195 and a retry counter 200. When the comparator 140 determines that the slip parameter P meets or exceeds the threshold T1, it sends the output signal 170 to the retry mechanism 185. The retry mechanism 185 will then send an output signal 205 to the accessory disengagement mechanism 210 (described below) to cause disengagement of the compressor 50 from the engine 20. The timer 190 controls the duration of output signal 205. The counter 200 controls how many times the retry mechanism will retry. The retry logic 195 uses the timer 190 and the counter 200 to retry disengaging and re-engaging the compressor 50 to attempt to correct the failure condition, such as overcoming stiction (discussed in more detail below). If the retry logic 195 fails to correct the failure after the predetermined number of times as set in the retry counter 200, it will permanently generate the output signal 205 to disengage the compressor 50 from the engine 20. In the preferred embodiment, the timer 190 counts for ten seconds and the counter 200 counts for three retry cycles. The retry logic 195 also generates a failure log signal 215 to the failure log mechanism 220 (described below) when permanently disengaging the compressor 50 from the engine 20. This prevents the operator from accidentally or intentionally turning off the engine 20 and then turning it back on or disengaging power from the electronic control module 75 in an attempt to re-engage the compressor 50. As described below, the compressor 50 cannot be re-engage following a failure without first resetting the failure log mechanism 220.

The comparator 145 generates the output signal 175 when the slip parameter P meets or exceeds the threshold T2. The output signal 175 is connected to the accessory disengagement circuit 210 which will cause disengagement of the compressor 50 from the engine 20. The output signal 175 is also connected to the failure log mechanism 220.

The comparator 150 generates the output signal 180 when the slip parameter P meets or exceeds the threshold T3. The output signal 180 is connected to the disengagement circuit 210 which generates the output 110 to first disengage the compressor 50 from the engine 20. The output signal 180 is further connected to the deactivation mechanism 225 to deactivate the engine 20. The output signal 180 is also connected to the failure log mechanism 220.

The accessory disengagement mechanism 210 includes inputs for the accessory engagement input 95, the output signal 205 from the retry mechanism 185, the output signal 175 from the comparator 145, the output signal 180 from the comparator 150 and the output signal 230 from the failure log mechanism 220 (described below). Further, the accessory disengagement mechanism 210 includes a logical "or" mechanism 240 and relay 245. The relay 245 is a normally closed relay switch that, when closed, passes the accessory engagement input 95 to the output 105 which connects to the engagement control mechanism 70. Output signals 205, 175, 180 and 230 connect to the logical "or" 240. The logical "or" mechanism 240 performs a logic "or" function which generates a signal to the control input of the relay 245. If any of the output signals 205, 175, 180 or 230 indicates that the compressor 50 should be disengaged, the logical "or" mechanism 240 will generate a signal to open the relay 245 resulting in interruption of the accessory engagement input 95 to the engagement control mechanism 70 causing disengagement of the compressor 50 is it was currently engaged. Alternately, the accessory disengagement mechanism 210 can be appropriately adapted according to the type of engagement control mechanism 70 utilized by the engine 20.

The deactivation mechanism 225 includes inputs for the output signal 180 of comparator 150, the output signal 235 of the failure log mechanism 220 and an output 110 which connects to the deactivation control mechanism 35. The deactivation mechanism 225 includes logic 250 which responds to the output signals 180, 235 to generate the output 110 and deactivate the engine 20. In the preferred embodiment, the output 110 is a digital signal. During normal operation, this signal is maintained as a logical "1." When the output signal 180 of comparator 150 indicates a failure or the output signal 235 of the failure log mechanism 200 indicates a prior deactivation, the logic 250 will drop the output 110 to logic "0" to indicate that the deactivation control mechanism 35 should deactivate the engine 20. Alternately, the deactivation mechanism 225 can be appropriately adapted to control the type of deactivation control mechanism 35 utilized with the engine 20.

The failure log mechanism 220 includes inputs for the output signals 215, 180 and 175. Further, the failure log mechanism 220 provides output signals 230 and 235. The failure log mechanism 220 includes a reset mechanism 255, prior failure logic 260, a trouble code generator 265 and a trouble code indicator 120. The prior failure logic 260 has inputs for output signals 215, 180 and 175. When output signals 215, 180, 175 indicate a condition that requires disengagement of the compressor 50 or deactivation of the engine 20, the prior failure logic logs that a failure has occurred and the type of failure. This log is permanently maintained, even if power is removed, until the prior failure logic receives a signal from the reset mechanism 255. Once a failure has been logged, the prior failure logic 260 generates the output signal 230 to the accessory disengagement mechanism or the output signal 235 to the deactivation mechanism 225 depending on the type of failure logged. If the failure that was logged was a failure that only required disengagement of the compressor 50, then the output signal 230 is asserted to cause disengagement of the compressor 50 from the engine 20. If the prior failure was a failure that required deactivation of the engine 20, then the output signal 235 is asserted to cause deactivation of the engine 20. The prior failure logic 260 also has an input for the output of the trouble code generator 265 (discussed below) to store the trouble code representing the severity of the failure. In the preferred embodiment, the reset mechanism 255 includes a magnetic reed switch which can only be triggered by holding a magnet near the switch. Alternatively, any kind of switch mechanism can be used, however it is preferred that this switch be of a type which prevents accidental operation. This prevents accidental clearing of the prior failure logic 260 which would allow re-engagement of the compressor 50 to the engine 20 before the failure has been repaired. The trouble code generator 265 also has inputs for output signals 215, 180 and 175. The trouble code generator 265 includes logic 270 that calculates a trouble code representing the severity of the failure. The trouble code generator 265 has an output to transmit the trouble code to the prior failure logic 260 and to the trouble code indicator 120 for display to repair personnel.

Finally, the ECM 75 provides warning indicator generator 275 that has inputs for the output signal from the logical OR mechanism 240 of the accessory disengagement mechanism 210 and an output 115 for an external warning indicator. Whenever the logical OR mechanism 240 indicates a failure condition, the warning indicator generator 275 activates the output 115. In the preferred embodiment, the external warning indicator is a driver warning lamp. Alternatively, the external warning indicator can be some other form of optical or audible indicator or no external warning indicator need be provided at all.

Figure 3:
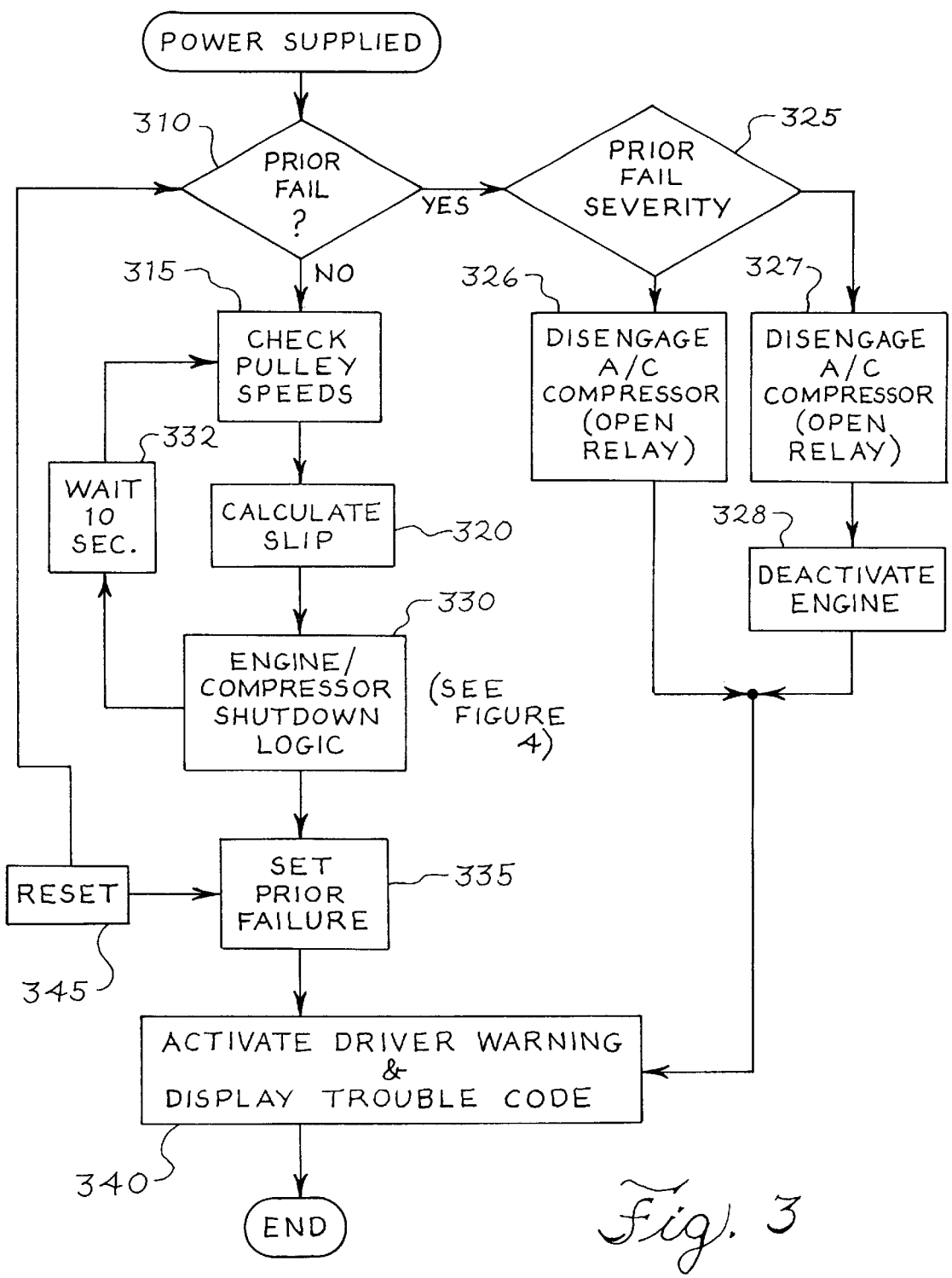
FIG. 3 is a flow chart depicting a method performed by the electronic control module of FIG. 2.

FIG. 3 shows a flow chart for a sequence of operations performed by the ECM 75 of the preferred embodiment. As was discussed earlier, relay 245 is normally closed and passes the accessory engagement input 95 to the engagement control mechanism 70. Output signals 205, 175, 180 and 230 connect to the logical "or" mechanism 240 of the accessory disengagement mechanism 210. The logical "or" mechanism 240 performs a logic "or" function which generates a signal to the control input of the relay 245. If any of the output signals 205, 175, 180 or 230 indicates that the compressor 50 should be disengaged, the logical "or" mechanism 240 will generate a signal to open the relay 245 resulting in interruption of the accessory engagement input 95 to the engagement control mechanism 70 causing disengagement of the compressor 50 if it was currently engaged. Effectively, the ECM passes the state of the operator's air conditioning control switch to the engagement control mechanism 70. If the operator desires that the air conditioning be turned on, and the relay 245 is closed, the compressor 50 is engaged. If not, or if the relay 245 is open (see below) the compressor 50 is disengaged. The relay 245 is continuously responsive to these signals until the engine is deactivated. Note that hereinafter, when it is said that the compressor 50 is disengaged, it is meant that relay 245 is opened and no longer passes the accessory engagement input 95 to the engagement control mechanism 70. It is important to note that whether or not the operator has turned on the accessory engagement input 95, the logical "or" mechanism 240 and the relay 245 are functioning. In this way, failure of the engagement control mechanism 70 itself can be monitored.

Concurrently with the operation of the relay 245, upon power being supplied to the power input 90, the ECM 75 checks for a prior failure (Step 310). If there has been a prior failure, the severity of the prior failure is determined (Step 325). If the prior failure resulted in prior disengagement of the compressor 50 (Step 325), the compressor 50 is disengaged from the engine 20 (Step 326) and the operator warning indicator is activated (Step 340). If the prior failure resulted in prior deactivation of the engine (Step 325), the compressor 50 is disengaged from the engine 20 (Step 327), the engine 20 is deactivated (Step 328), the operator warning indicator is activated and the trouble code representing the prior failure is displayed on the trouble code indicator 120 (Step 340). Alternatively, only the trouble code indicator 120 can be activated.

If there has been no prior failure at step 310, then the rotational speeds of the engine 20 and the compressor 50 are determined (Step 315). From the rotational speeds of the engine 20 and compressor 50, the slip parameter P is calculated (Step 320). The slip parameter P is then compared against the threshold values, T1, T2 and T3 in the engine/compressor shutdown logic (Step 330, see also FIG. 4) to determine if there is a failure and what action should be taken. If there is no failure, the ECM 75 waits for 10 seconds (Step 332) and then returns control to step 315 to check again. Alternatively, the delay between checking the rotational speeds can be longer or shorter. It is preferred that this delay be set so that momentary fluctuations in pulley speeds, such as from rain water seeping under the belt, or from a sudden jolt to the engine, don't trigger an unnecessary response from the ECM 75. Notice that if the operator turns the accessory engagement input 95 off, the compressor 50 will be disengaged meaning that the second pulley 47 will continue to rotate even though the engagement control mechanism 70 will not be transferring that rotation to the shaft 45 on the compressor 50. Therefore, this condition will not be detected as a failure of the compressor 50.

Figure 4:
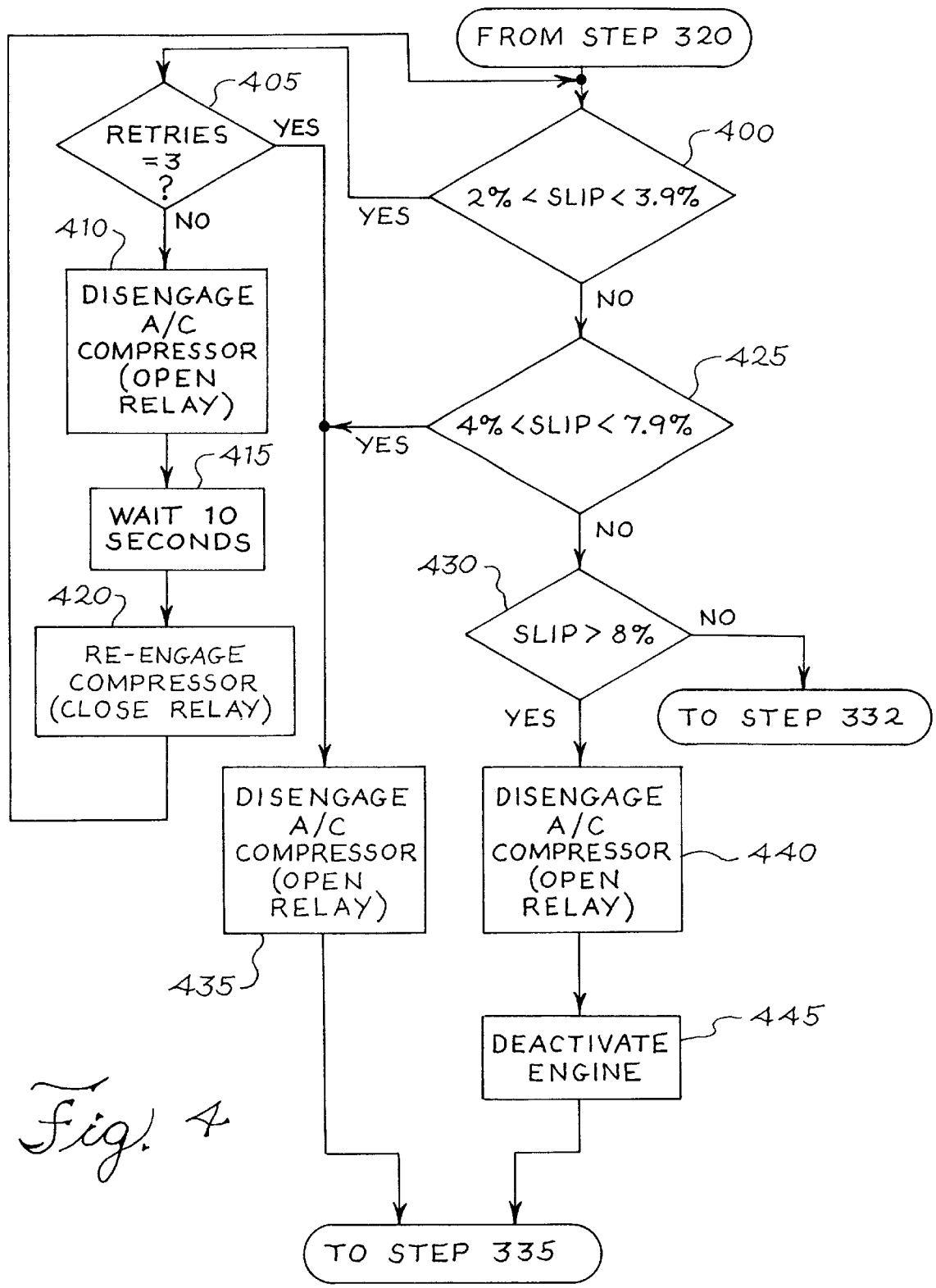
FIG. 4 is a more detailed flow chart of Step 330 of the method depicted in FIG. 3.

The shutdown logic of Step 330 executes the following steps as shown in FIG. 4. In the event the slip parameter P indicates 2% to 3.9% slip (Step 400), the compressor 50 is disengaged (Step 410) from the engine 20 for 10 seconds (Step 415) and then the compressor 50 is re-engaged to the engine 20 (Step 420). In the event that the slip parameter P again indicates 2%–3.9% slip, steps 400 through 420 are retried up to three times (Step 405). If the slip parameter P has not returned to a slip of less than 2%, the compressor 50 is permanently disengaged from the engine 20 (Step 435) and control is transferred to step 335. Alternatively, the engine 20 can be deactivated. In the event that the slip parameter P indicates that the failure condition has been corrected and that the slip parameter P has decreased below 2%, control falls through Steps 425 and 430 and is transferred to step 332. It is noted that, depending on the type of primary mover, the type of load and the coupling means used to connect them, the slip percentages, the delay time between retries and the number of retries can be adjusted for the various failure conditions that can occur. Further, depending on the type of sensor used, the slip percentages can be adjusted to represent ranges appropriate to the type of sensor used such as a temperature range for use with a thermal sensor. As discussed earlier, in the preferred embodiment, this threshold value is stored as a jumper setting on the printed circuit board. In the preferred embodiment, this jumper can have values of 1, 2, 3 and 4% resulting in possible low slip ranges of 1–1.9%, 2–3.9%, 3–5.9% and 4–7.9% depending on the setting of the jumper.

In the event the slip parameter P indicates 4% to 7.9% slip (Step 425), the compressor 50 is disengaged from the engine 20 (Step 435) and control is transferred to step 335. Alternatively, the engine 20 can be deactivated. In the event the slip parameter P indicates slip of 8% or greater (Step 430), the compressor 50 is disengaged from the engine 20 (Step 440), the engine 20 is deactivated (Step 445) and control is transferred to step 335. It is noted that, depending on the type of primary mover, the type of load and the coupling means used to connect them, these slip percentages can be adjusted for the various failure conditions that can occur. Further, depending on the type of sensor used, the slip percentages can be adjusted to represent ranges appropriate to the type of sensor used such as a temperature range for use with a thermal sensor. As discussed above, in the preferred embodiment, this intermediate threshold value is set as a multiple of two of the value set by the jumper (1, 2, 3 or 4%) and the high slip threshold is set as a multiple of four of the value set by the jumper (1, 2, 3 or 4%). This results in possible intermediate slip ranges of 2–3.9%, 4–7.9%, 6–11.9%, 8–15.9% and possible high slip ranges of 4, 8, 12 or 16% depending on the setting of the jumper.

Returning to FIG. 3, if the engine/compressor shut down logic detects a failure, control is transferred to Step 335 where a failure condition is logged (Step 335) along with a trouble code which represents the severity of the failure and the action (disengagement or deactivation) taken. This failure information represents the prior failure condition that is checked at step 310. An operator warning indicator is then activated and the trouble code determined at Step 335 is displayed on the trouble code indicator 120 (Step 340). Alternatively, only the trouble code can be displayed. Note that the prior failure condition checked at step 310 can only be cleared by step 345, where a reset of the prior failure condition is performed which clears the log of the prior failure.

The microfiche appendix includes a listing of an exemplary program listing and associated circuit schematic that implement the above logic. Further, an exemplary microcontroller for use in the ECM 75 is the Phillips Semiconductor's 8 bit micro-controller, model #87c751 and exemplary sensors which can be used as the first sensor 10 and the second sensor 40 are manufactured by Coils, Inc., Part No. 22591938.

From the foregoing detailed description, a preferred monitoring apparatus for detecting and responding to failure of a secondary load coupled to a primary mover has been described. This monitoring apparatus has the advantage of a staged response to different failure scenarios. In response to a minor failure of the secondary load, the monitoring apparatus can temporarily disengage the secondary load and the re-engage it to try and clear the failure. In response to a intermediate failure, the monitoring apparatus can disengage the secondary load to prevent further damage to the secondary load and allow the primary mover to continue operating unimpeded. Where there is a major failure, where solely disengaging the secondary load will not alleviate the problem, the primary mover can be deactivated to mitigate further damage.

It will be appreciated that the foregoing description is for one embodiment but from the flow charts, one skilled in the art will recognize that there are other ways to implement the described logic. For example, one can implement the logic as an analog circuit. Further, one can implement the logic using other forms of digital processors including variations of AMD or Intel x86, Motorola 680x0 or Power PC based processors as custom ASIC logic. In addition, the logic can be implemented using a variety of programming languages and techniques such as x86 or 680x0 or C++, Basic, Fortran as well as other object oriented programming languages. Further, one skilled in the art will appreciate that the preferred monitoring apparatus described can be used in any situation where a secondary load is coupled to a primary mover. Examples of such situations include an engine (diesel, gasoline, turbine or electric) coupled to an air conditioning compressor, a refrigeration compressor, a power steering pump, a cooling fan, a water pump, an alternator, a generator, a transmission, a drive train, a drive wheel or a drive track.

It is intended that the foregoing detailed description be regarded as illustrative rather than limiting, and that it be understood that the following claims, including all equivalents, are intended to define the scope of this invention.

We claim:

1. An apparatus for controlling engagement of a secondary load to a primary mover comprising:

a first sensor adapted to sense rotation of a primary mover said first sensor providing a first sensor output representative of a rotational parameter of said primary mover;

a second sensor adapted to sense rotation of a secondary load, said second sensor providing a second sensor output representative of rotational parameter of said secondary load; and an electronic control module coupled to said first and second sensor outputs and further adapted to be coupled to said primary mover and said secondary load;

wherein said electronic control module comprises logic responsive to said first and second sensors and operative to generate a first signal to control engagement of said secondary load to said primary mover and a second signal to control the operation of said primary mover.

2. The apparatus of claim 1 wherein said logic comprises:

first and second inputs for receiving said first and second sensor outputs;

a first output for transmitting said first signal;

a second output for transmitting said second signal;

a calculation circuit coupled to said first and second inputs and operative to calculate a slip parameter from said first and second sensor outputs;

a comparator circuit coupled to said calculation circuit and said first and second outputs and operative to compare said slip parameter to a plurality of thresholds;

wherein said comparator circuit is further operative to generate said first and second signals based on said comparison.

3. The apparatus of claim 2 wherein said logic comprises an analog circuit.

4. The apparatus of claim 2 wherein said logic comprises a digital logic circuit.

5. A method for controlling a driving force applied by an engine to a power take-off driven accessory comprising the steps of:
   (a) sensing rotational parameters of at least one of said engine and said accessory;
   (b) calculating a slip parameter from said sensed rotational parameters;
   (c) applying a disengagement signal to said accessory when said slip parameter is within a first range of slip; and
   (d) applying a deactivation signal to said engine when said slip parameter is within a second range of slip.

6. The method of claim 5 wherein steps (c) and (d) further comprise the step of generating a warning signal.

7. The method of claim 6 wherein said warning signal comprises an illuminated lamp.

8. The method of claim 6 wherein said warning signal comprises a trouble code.

9. The method of claim 5 further comprising the steps of:
   (e) applying said disengagement signal to said accessory when said slip parameter is within a third range of slip; and
   (f) terminating said disengagement signal to said accessory after a pre-determined time delay.

10. The method of claim 9 further comprising the steps of:
    (g) repeating steps (e) and (f) for a pre-determined number of repetitions; and
    (h) re-applying said disengagement signal to said accessory when said slip parameter is within said third range of slip.

11. The method of claim 10 wherein steps (c), (d), (e) and (h) further comprise the step of generating a warning signal.

12. The method of claim 11 wherein said warning signal comprises an illuminated lamp.

13. The method of claim 11 wherein said warning signal comprises a trouble code.

14. The method of claim 5 wherein said first range of slip is about 4 to 7.9 percent.

15. The method of claim 5 wherein said second range of slip is about 8 to 100 percent.

16. The method of claim 9 wherein said first range of slip is about 4 to 7.9 percent.

17. The method of claim 9 wherein said second range of slip is about 8 to 100 percent.

18. The method of claim 9 wherein said third range of slip is about 2 to 3.9 percent.

19. The method of claim 5 wherein said first range of slip, said second range of slip and said third range of slip are user programmable.

20. The method of claim 9 wherein said first range of slip, said second range of slip and said third range of slip are user programmable.

21. An electronic control module for use in a system for monitoring an engine power take-off driven accessory, said system comprising at least one sensor responsive to rotational parameters of an engine and an accessory, said engine comprising an engine activation control operative to deactivate said engine, said accessory comprising an accessory engagement control operative to disengage said accessory from said engine, said module comprising:
    at least one input coupled to said at least one sensor;
    a first output coupled to said accessory engagement control;
    a second output coupled to said engine activation control; and
    means for comparing said rotational parameters to a plurality of pre-set thresholds;
    means for disengaging said accessory based on said comparison; and
    means for deactivating said engine based on said comparison.

22. The electronic control module of claim 21 further comprising:
    a third output coupled to a warning indicator; and
    means for activating said warning indicator when disengaging said accessory.

23. The electronic control module of claim 21 further comprising:
    a failure indicator for indicating one of two states, said states comprising a failure state and a non-failure state;
    means for setting said failure indicator to said failure state from said non-failure state when said accessory is disengaged;
    means for setting said failure indicator to said failure state from said non-failure state when said engine is deactivated; and
    means for disengaging said accessory when said failure indicator is set to said failure state.

24. The electronic control module of claim 23 further comprising means for resetting said failure indicator to said non-failure state.

25. The electronic control module of claim 24 wherein said means for resetting said failure indicator comprises a magnetic reed switch.

26. A method for protecting an engine power take-off driven accessory comprising the steps of:
    (a) sensing pulley rotational parameters of at least one of said engine and said accessory;
    (b) calculating a slip parameter from said sensed pulley rotational parameters;
    (c) providing first, second and third slip ranges, where said second slip range represents more severe slip than said first slip range and said third slip range represents more severe slip than said second slip range;
    (d) activating a warning indicator when said slip parameter is within at least one of said first, second and third slip ranges;
    (e) disengaging said accessory from said engine for a pre-determined time delay when said slip parameter is within said first slip range and then subsequently re-engaging said accessory;
    (f) disengaging said accessory from said engine when said slip parameter is within said second slip range; and
    (g) deactivating said engine when said slip parameter is within said third slip range.

27. The method of claim 26 further comprising the steps of:
    (h) reading a failure indicator to determine if said accessory has previously failed and disengaging said accessory from said engine when said failure indicator indicates previous failure;
    (i) setting said failure indicator when said slip parameter indicates at least one of said first, second and third slip levels; and
    wherein step (d) further comprises the step of activating said warning indicator when said failure indicator indicates previous failure.

28. The method of claim 27 further comprising the steps of:
(k) clearing said failure indicator in response to repair of said accessory.

29. The method of claim 26 further comprising the steps of:
(h) Repeating step (e) for a pre-set number of repetitions; and
(i) disengaging said accessory from said engine when said slip parameter is within said first slip range after step (h) has completed.

30. An apparatus for controlling engagement of a secondary load to a primary mover comprising:
at least one sensor adapted to sense rotation of said secondary load and said primary mover, said at least one sensor providing a sensor output representative of rotational speed of said secondary load and said primary mover;
an electronic control module coupled to said sensor output and further coupled to said primary mover and said secondary load;
wherein said electronic control module comprises logic responsive to said at least one sensor and operative to generate a first signal to control engagement of said secondary load to said primary mover and a second signal to control operation of said primary mover.

31. The apparatus of claim 30 wherein said logic comprises:
at least one input for receiving said sensor output;
a first output for transmitting said first signal;
a second output for transmitting said second signal;
a calculation circuit coupled to said at least one input and operative to calculate a slip parameter from said sensor output; and
a comparator circuit coupled to said calculation circuit and said first and second outputs and operative to compare said slip parameter to a plurality of thresholds;
wherein said comparator circuit is further operative to generate said first and second signals based on said comparison.

32. The apparatus of claim 31 wherein said logic comprises an analog circuit.

33. The apparatus of claim 31 wherein said logic comprises a digital logic circuit.

34. A system for detecting failure of an engine power take-off driven accessory comprising:
at least one sensor to sense a rotational parameter of an engine and an accessory;
an electronic control module responsive to said at least one sensor and comprising:
means for generating a first signal to disengage said accessory from said engine based on a comparison of said rotational speeds with a first threshold;
means for generating a second signal to deactivate said engine based on a comparison of said rotational speeds with a second threshold.

35. The system of claim 34 wherein said electronic control module further comprises means for terminating and subsequently re-generating said signal to disengage said accessory from said engine to correct failure of said accessory.

36. The system of claim 34 wherein said at least one sensor comprises a first sensor and a second sensor.

37. The system of claim 35 wherein said at least one sensor comprises a first sensor and a second sensor.

38. A method for controlling a driving force applied by an engine to a power take-off driven accessory comprising the steps of:
(a) sensing rotational parameters of at least one of said engine and said accessory;
(b) applying a disengagement signal to said accessory when said sensed rotational parameters are within a first range of slip; and
(c) terminating said disengagement signal to said accessory after a pre-determined time delay;
(d) repeating steps (b) and (c) for a pre-determined number of repetitions;
(e) applying said disengagement signal to said accessory when said sensed rotational parameters are within said first range of slip.
(f) applying said disengagement signal to said accessory when said sensed rotational parameters are within a second range of slip.

39. The method of claim 38 wherein steps (b), (e) and (f) further comprise the step of generating a warning signal.

40. The method of claim 39 wherein said warning signal comprises an illuminated lamp.

41. The method of claim 39 wherein said warning signal comprises a trouble code.

42. A system for detecting failure of an engine power take-off driven accessory comprising:
first and second sensors to sense a rotational parameter of an engine and an accessory;
an electronic control module responsive to said first and second sensors and comprising:
means for generating a signal to disengage said accessory from said engine based on a comparison of said rotational parameters with a first threshold;
means for terminating and subsequently re-generating said signal to disengage said accessory from said engine to correct failure of said accessory.

43. An electronic control module for use in a system for monitoring an engine power take-off driven accessory, said system comprising at least one sensor responsive to rotational parameters of said engine and said accessory, said accessory comprising an accessory engagement control operative to disengage said accessory from said engine, said module comprising:
at least one input coupled to said at least one sensor;
a first output coupled to said accessory engagement control;
means for comparing said rotational parameters to a plurality of pre-set thresholds to detect a failure condition of said accessory;
means for disengaging said accessory based on said comparison;
means for retrying engaging said accessory to correct said failure condition; and
means for disengaging said accessory when said failure condition persists.

44. The electronic control module of claim 43 comprising:
a second output coupled to a warning indicator; and
means for activating said warning indicator when disengaging said accessory.

45. An apparatus for controlling engagement of a secondary load to a primary mover, said primary mover operable to propel a vehicle, said apparatus comprising:
a first sensor adapted to sense rotation of said primary mover, said first sensor providing a first sensor output representative of a rotational parameter of said primary mover;

a second sensor adapted to sense rotation of a secondary load, said second sensor providing a second sensor output representative of a rotational parameter of said secondary load; and an electronic control module coupled to said first and second sensor outputs and further adapted to be coupled to said primary mover and said secondary load;

wherein said electronic control module comprises logic responsive to said first and second sensors and operative to generate a first signal to control engagement of said secondary load to said primary mover while maintaining operation of said primary mover and a second signal to control the operation of said primary mover.

46. The apparatus of claim 45 wherein said logic comprises:

first and second inputs for receiving said first and second sensor outputs;

a first output for transmitting said first signal;

a second output for transmitting said second signal;

a calculation circuit coupled to said first and second inputs and operative to calculate a slip parameter from said first and second sensor outputs;

a comparator circuit coupled to said calculation circuit and said first and second outputs and operative to compare said slip parameter to a plurality of thresholds;

wherein said comparator circuit is further operative to generate said first and second signals based on said comparison.

* * * * *

UNITED STATES PATENT AND TRADEMARK OFFICE
CERTIFICATE OF CORRECTION

PATENT NO. : 6,249,726 B1
DATED : June 19, 2001
INVENTOR(S) : J. O. Burke, II et al.

It is certified that error appears in the above-identified patent and that said Letters Patent is hereby corrected as shown below:

Column 13,
Line 7, delete "Repeating" and substitute -- repeating -- in its place.

Column 14,
Line 15, immediately after "slip" delete "." (period) and substitute -- ; -- (semicolon) in its place.
Line 61, after "claim 43" insert -- further --.

Signed and Sealed this

Thirtieth Day of April, 2002

*Attest:*

*Attesting Officer*

JAMES E. ROGAN
*Director of the United States Patent and Trademark Office*